March 15, 1932.   P. E. C. SATER   1,849,206
BUSHING
Filed March 17, 1930
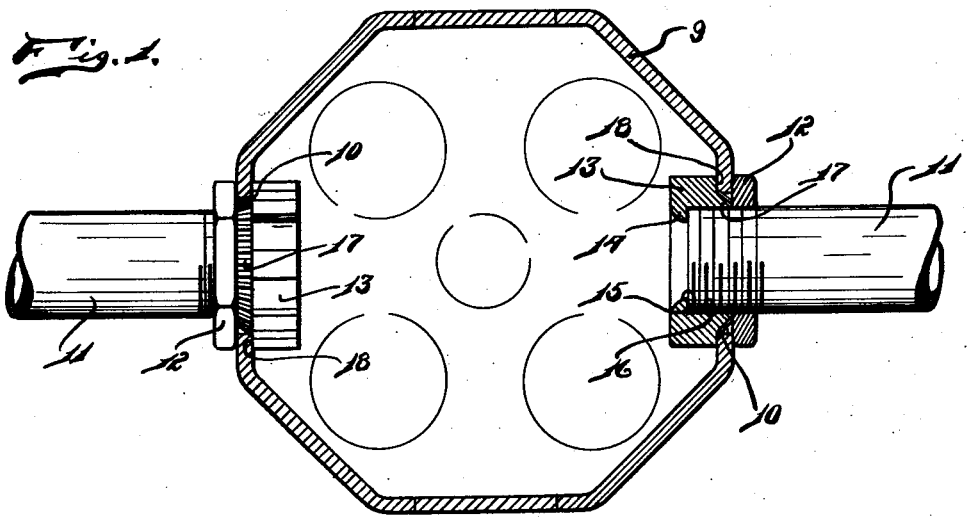
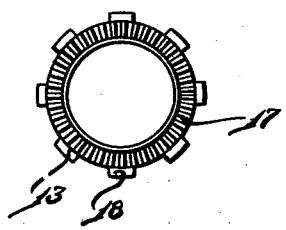
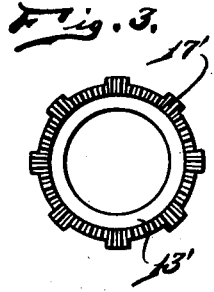
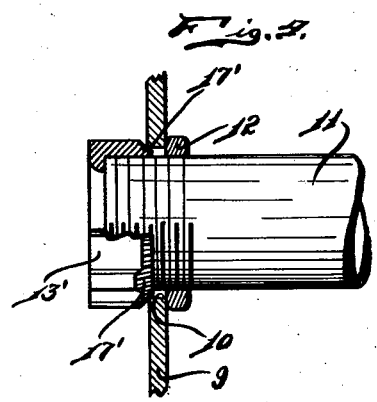
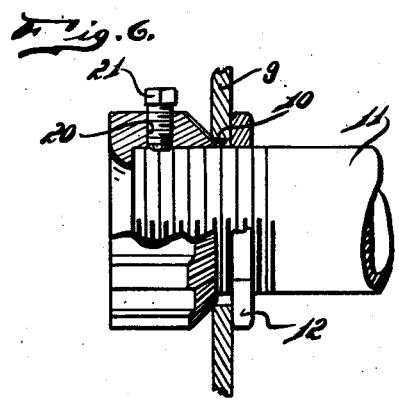
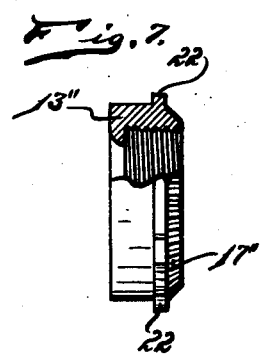
INVENTOR.
Peter E. C. Sater
BY
ATTORNEY.

Patented Mar. 15, 1932                                            1,849,206

UNITED STATES PATENT OFFICE

PETER E. C. SATER, OF DETROIT, MICHIGAN

BUSHING

Application filed March 17, 1930. Serial No. 436,343.

My invention relates to a new and useful improvement in a bushing for electric conduits particularly adapted for use on a conduit whether rigid or flexible in securing the same to an outlet box, cabinet, or similar wiring device.

At the present time most conduits or pipes for electric conductors on ordinary lighting installations are of one-half inch, three-fourths inch, and one inch diameter although other standard sizes are sometimes used. The three sizes of conduits mentioned, however, predominate and the outlet boxes or cabinets are provided with knockouts so that when removed the required openings to receive the pipes or conduits are provided. Since most of the outlet boxes or cabinets are formed from thin metal, when the knockout plug is removed a burr is generally left around the opening. Inasmuch as the knockout plug is not removed until the artisan is ready to install the box or cabinet there is no convenient way of removing the burr surrounding the opening. Frequently, also, an outlet box or cabinet is used in which the openings provided therein after the knockout plugs are removed are of greater diameter than the conduit or pipe which is to project thereinto. A tight joint of the conduit or pipe at this point is required by practically all building codes and underwriters' requirements. To provide means for connecting a pipe or conduit on an outlet box or cabinet whereby the conduit or pipe connected thereto may be of smaller diameter than the opening in the outlet box or cabinet and whereby a secure and tight joint may be provided regardless of the burr is one of the objects of the present invention.

Another object of the invention is a bushing and connection of this class which may be forced into the burred portion so as to firmly engage and seat against the undisturbed portion of the outlet box and provide a secure and tight joint.

Another object of the invention is the provision of a bushing of this class which may be used on openings of various sizes and which will readily seat itself concentrically of the opening when the joint is being brought to a tight and secure condition.

Another object of the invention is the provision of a bonding bushing of this class having one end thereof tapered peripherally.

Another object of the invention is the provision of a bonding bushing of this class having a tapered end provided with corrugations or serrations at its end side.

Another object of the invention is the provision of a bonding bushing of this class having a reinforcing projection on its periphery at diametrically opposite points and provided at said points with a radially directed interiorly threaded opening for the reception of a set screw.

Other objects will appear hereinafter.

The invention consists in the combination and arrangement of parts hereinafter described and claimed.

The invention will be best understood by a reference to the accompanying drawings which form a part of this specification and in which, Fig. 1 is a sectional view of an outlet box showing the invention applied, one side showing the invention in side elevation and the other showing it sectionally.

Fig. 2 is an end elevational view of the invention.

Fig. 3 is a view similar to Fig. 2 taken from the opposite end of the invention.

Fig. 4 is a view of the invention showing a part in side elevation and a part broken away.

Fig. 5 is an end elevational view of a modified form of the invention.

Fig. 6 is a side elevational view of the form shown in Fig. 5 with parts broken away and parts shown in section.

Fig. 7 is a side elevational view of a modified form of the invention with a part broken away and a part shown in section.

In Fig. 1 I have shown an outlet box 9 having an opening 10 from which the knockout plug has been removed and into which is adapted to project the conduit 11 threaded at one end to receive the lock nut 12 and at the opposite end to receive the bonding bushing 13 which has the interiorly projecting flange 14 at one end to provide an opening 15 smaller than the opening 16 which threads onto the conduit 11. The bushing is cut away to provide the forwardly positioned tapered portion 17 and also to provide the shoulder 18. The peripheral surface of the tapered portion 17 is corrugated or formed with teeth so that as the bushing is threaded onto the conduit 11 and the tapered portion 17 enters the opening 10 a reaming operation is effected, removing the burr from the inner surface of the box 9 and thus permitting a seating of the bonding bushing 13 firmly against the box 9. This tapered portion serves to engage the edges of the opening 10 and firmly hold the pipe 11 in position even though the pipe itself is of smaller diameter than the opening 10.

In Fig. 4 I have shown the bushing 13′ with a tapered portion 17′ extending inwardly from the periphery of the main body of the bushing, the inclined peripheral portion of this tapered portion 17′ being also roughened for reaming purposes.

In the form shown in Fig. 5 and Fig. 6 the construction is similar to that shown in Fig. 4 excepting that comparatively wide bosses or enlargements 19 are provided at diametrically opposite points each of which is provided with the radially directed threaded opening 20 for the reception of a set screw 21 which may serve to lock the bushing against rotation on the conduit or pipe 11. By having the set screws at diametrically opposite points it becomes necessary to turn the bushing but a quarter of a turn in order to render the set screw accessible so that there is a marked advantage in having a pair of threaded openings 20.

In the form shown in Fig. 7 I have provided the bushing 13″ with the peripheral flange 22 which serves the function of the shoulder 18 in the form shown in Fig. 1.

In all of the forms shown it will be noted that the tapered portion of the bushing serves to center the conduit 11 relatively to the opening 10. At the same time, the bushing also serves as a bond or seal for the opening.

While I have illustrated and described the preferred form of construction of my invention, I do not wish to limit myself to the precise details of structure shown but desire to avail myself of such variations and modifications as may come within the scope of the appended claims.

Having thus described my invention, what I claim as new and desire to secure by Letters Patent is:

1. A bonding bushing of the class described adapted for securing a pipe projected through an opening in material, comprising: a body threadable on said pipe and having an axially directed portion and a tapered portion at one end provided with cutting teeth on its periphery, said tapered portion projecting partially through said opening, and a lock nut on the pipe disposed at the other side of the opening.

2. A bonding bushing of the class described adapted for securing a pipe projected through an outlet box opening, comprising a body having a pipe receiving threaded portion and an inwardly projecting flange at one end of the threaded portion to provide a stop for the end of the pipe, and a tapered portion at one end of the body provided with cutting teeth on its tapered periphery, said tapered portion projecting partially into said opening, and a lock nut on the pipe disposed at the other side of the opening.

3. A bonding bushing of the class described adapted for securing a pipe projected through an outlet box opening, comprising a body having a pipe receiving threaded portion and an inwardly projecting stop at one end of the threaded portion to abut the end of the pipe, and a tapered portion at one end of the body provided with cutting teeth on its tapered periphery, said tapered portion projecting partially into said opening, and an abutment forming shoulder terminating rearwardly of the tapered portion to contact the housing wall and limit the inward movement and cutting action of the teeth, and a lock nut on the pipe disposed at the other side of the opening.

In testimony whereof I have signed the foregoing specification.

PETER E. C. SATER.